(12) United States Patent
Oda et al.

(10) Patent No.: US 10,018,084 B2
(45) Date of Patent: Jul. 10, 2018

(54) LUBRICATING STRUCTURE OF INTERNAL COMBUSTION ENGINE AND MOTORCYCLE

(71) Applicant: SUZUKI MOTOR CORPORATION, Hamamatsu-shi, Shizuoka (JP)

(72) Inventors: Tomoyuki Oda, Hamamatsu (JP); Kohei Tsukamoto, Hamamatsu (JP); Shintaro Yagi, Hamamatsu (JP)

(73) Assignee: SUZUKI MOTOR CORPORATION, Hamamatsu-Shi (JP)

( * ) Notice: Subject to any disclaimer, the term of this patent is extended or adjusted under 35 U.S.C. 154(b) by 150 days.

(21) Appl. No.: 15/333,936

(22) Filed: Oct. 25, 2016

(65) Prior Publication Data

US 2017/0114685 A1  Apr. 27, 2017

(30) Foreign Application Priority Data

Oct. 27, 2015 (JP) .................. 2015-210366
Oct. 27, 2015 (JP) .................. 2015-210367

(51) Int. Cl.
| | | |
|---|---|---|
| *F01M 9/10* | (2006.01) | |
| *F01M 1/04* | (2006.01) | |
| *F01M 11/02* | (2006.01) | |
| *F16F 15/26* | (2006.01) | |
| *F02B 61/02* | (2006.01) | |

(52) U.S. Cl.
CPC ............ *F01M 11/02* (2013.01); *F02B 61/02* (2013.01); *F16F 15/267* (2013.01); *F01M 2011/026* (2013.01); *F01M 2011/028* (2013.01)

(58) Field of Classification Search
CPC .... F01M 11/02; F01M 1/02; F01M 2011/028; F01M 1/06; F01M 2011/026; F16F 15/264; F16F 15/265; F16F 15/267; F16F 15/268; F16F 15/26; F16F 15/20; F16F 15/22; F16F 2232/02; F02B 61/02
USPC .......................................... 123/196 R, 196 CP
See application file for complete search history.

(56) References Cited

U.S. PATENT DOCUMENTS

| | | | |
|---|---|---|---|
| 5,884,599 A * | 3/1999 | Shiozaki ................. | F02B 61/02 123/192.2 |
| 6,263,853 B1 * | 7/2001 | Rau ........................ | F02F 7/0007 123/192.2 |
| 2007/0272194 A1 * | 11/2007 | Hoi ........................ | B63B 35/731 123/196 R |
| 2011/0067666 A1 * | 3/2011 | Hashimoto .............. | F01M 1/02 123/192.2 |

(Continued)

FOREIGN PATENT DOCUMENTS

JP          2015-90146 A          5/2015

*Primary Examiner* — Syed O Hasan
(74) *Attorney, Agent, or Firm* — Stein IP, LLC (57) ABSTRACT

A lubricating structure of an internal combustion engine that feeds oil to a driveshaft of a transmission disposed in parallel with a crankshaft and a balancer shaft in a crankcase, wherein the balancer shaft is disposed below the crankshaft and the driveshaft is disposed at rear of the crankshaft, and a main gallery, a first oil passage, a second oil passage and a third oil passage are formed in the crankcase as defined herein, and a lubricating structure of an internal combustion engine that feeds oil to a bearing of a balancer shaft disposed in parallel with a crankshaft in a crankcase, wherein a main gallery, a first oil passage, and a second oil passage are formed in the crankcase as defined herein.

11 Claims, 7 Drawing Sheets

(56) References Cited

U.S. PATENT DOCUMENTS

2015/0159525 A1\* 6/2015 Matsuda ................ F02B 39/12
123/196 A

\* cited by examiner

LUBRICATING STRUCTURE OF INTERNAL COMBUSTION ENGINE AND MOTORCYCLE

CROSS-REFERENCE TO RELATED APPLICATIONS

This application claims the benefit of Japanese Patent Application JP 2015-210366, filed Oct. 27, 2015, and Japanese Patent Application JP 2015-210367, filed Oct. 27, 2015, the entire contents of which are hereby incorporated by reference, the same as if set forth at length.

FIELD OF THE INVENTION

The present invention relates to a lubricating structure of an internal combustion engine which feeds oil to respective portions of the internal combustion engine, and a motorcycle.

BACKGROUND OF THE INVENTION

In a lubricating structure of an internal combustion engine, generally, oil is pumped up from an oil pan by an oil pump, and fed to respective portions of the internal combustion engine through oil passages diverging from a main gallery. As this type of lubricating structure of the internal combustion engine, there has been known a lubricating structure of an internal combustion engine in which an oil passage extending toward a crankshaft and an oil passage extending toward various transmission shafts such as a driveshaft are separated (e.g. see JP-A-2015-090146). In the internal combustion engine according to JP-A-2015-090146, a main gallery is formed below the crankshaft, and an oil passage is formed to extend from the main gallery and obliquely upward and rearward toward the driveshaft which is disposed at the rear of the crankshaft. In the internal combustion engine according to JP-A-2015-090146, the oil passage extending from the main gallery toward the various transmission shafts is diverged into parts in the middle, and oil is fed to a bearing of a balancer shaft in an upper portion of the crankcase through one of the diverged parts of the oil passage.

SUMMARY OF THE INVENTION

However, in the lubricating structure of the internal combustion engine according to JP-A-2015-090146, the main gallery is disposed below the crankshaft so that the balancer shaft etc. cannot be disposed below the crankshaft. On the other hand, it may be considered that the balancer shaft etc. is disposed below the crankshaft while the position where the main gallery should be formed is changed. However, this solution has a problem that the oil passage from the main gallery up to the driveshaft may be complicated. Therefore, the oil passage becomes longer. Consequently, oil pressure loss due to resistance of the oil passage increases, and oil pressure followability to fluctuation in rotation of the crankshaft is deteriorated.

A first aspect of the invention has been accomplished in consideration of such a point. An object of the first aspect of the invention is to provide a lubricating structure of an internal combustion engine in which oil passages from a main gallery up to a driveshaft can be simplified, and a motorcycle.

In the lubricating structure of the internal combustion engine according to JP-A-2015-090146, the oil passage extends from the main gallery in a lower portion of the crankcase toward the bearing of the balancer shaft in an upper portion of the crankcase. The crankshaft or a transmission shaft is disposed between the main gallery and the balancer shaft. For this reason, when the oil passage is formed in order to bypass the crankshaft or the transmission shaft, the oil passage becomes complicated. Therefore, the oil passage becomes longer. Consequently, pressure loss due to resistance of the oil passage increases, and oil pressure followability to fluctuation in rotation of the crankshaft is deteriorated. Further, when a plurality of pipe passages are intersected to form the oil passage, the weight of the crankcase increases and burring occurs in the intersecting portion.

A second aspect of the invention has been accomplished in consideration of such a point. An object of the second aspect of the invention is to provide a lubricating structure of an internal combustion engine in which oil passages extending from a main gallery up to a bearing of a balancer shaft can be simplified, and a motorcycle.

The lubricating structure of the internal combustion engine according to the first aspect of the invention is a lubricating structure of an internal combustion engine that feeds oil to a driveshaft of a transmission disposed in parallel with a crankshaft and a balancer shaft in a crankcase, wherein: the balancer shaft is disposed below the crankshaft and the driveshaft is disposed at the rear of the crankshaft; and a main gallery, a first oil passage, a second oil passage, and a third oil passage are formed in the crankcase, so that oil can be distributed to respective portions of the internal combustion engine through the main gallery located in front of the balancer shaft, the oil of the main gallery can be fed to a bearing of the crankshaft through the first oil passage, the oil having passed through the bearing of the crankshaft can be fed to a bearing of the balancer shaft through the second oil passage, and the oil having passed through the bearing of the crankshaft can be fed to the driveshaft through the third oil passage diverging from the middle of the second oil passage.

According to the configuration, the balancer shaft is disposed below the crankshaft. Accordingly, the width of the crankcase in a front/rear direction can be reduced, and mass centralization can be attained. In addition, oil is fed from the main gallery to the bearing of the crankshaft through the first oil passage. The oil is fed to the bearing of the balancer shaft through the second oil passage. Further, the oil is fed to the driveshaft through the third oil passage. The oil is fed to the midway of the driveshaft through the first oil passage shared with the bearing of the crankshaft and the second oil passage shared with the bearing of the balancer shaft. Accordingly, the oil passages from the main gallery toward the driveshaft can be simplified. Since the oil passages can be shortened, pressure loss due to resistance of the oil passages can be reduced, and oil pressure followability to fluctuation in rotation of the crankshaft can be improved.

In the lubricating structure of the internal combustion engine in the first aspect of the invention, preferably, the crankcase may include an upper case and a lower case that are divided from each other vertically, and the third oil passage may diverge from the middle of the second oil passage and extend obliquely toward a mating face between the upper case and the lower case. According to the configuration, the third oil passage extending toward to the driveshaft can be shortened.

In the lubricating structure of the internal combustion engine in the first aspect of the invention, preferably, the first oil passage, the second oil passage and the third oil passage may be formed in a journal wall that supports one end of the crankshaft. According to the configuration, the first oil passage, the second oil passage and the third oil passage are formed in the same journal wall. Accordingly, the oil passages from the main gallery toward the driveshaft can be simplified.

In the lubricating structure of the internal combustion engine in the first aspect of the invention, preferably, the first oil passage may extend obliquely toward the bearing of the crankshaft from the main gallery, and the first oil passage and the third oil passage may have the same inclination angle with respect to the mating face between the upper case and the lower case. According to the configuration, the first oil pressure and the third oil passage can be formed by machining the crankcase from the same direction. Thus, machining cost can be reduced.

In the lubricating structure of the internal combustion engine in the first aspect of the invention, preferably, the first oil passage and the third oil passage may have the same passage diameter. According to the configuration, the first oil passage and the third oil passage can be formed by use of a machining tool having the same diameter. Thus, machining cost can be reduced.

In the lubricating structure of the internal combustion engine in the first aspect of the invention, preferably, an orifice mounting portion in which an orifice for adjusting the passage diameter can be mounted may be formed in the third oil passage. According to the configuration, the orifice is mounted in the orifice mounting portion. Thus, even when the third oil passage is formed to have the same diameter as the first oil passage, an oil flow rate from the third oil passage toward the driveshaft can be suppressed.

A motorcycle in the first aspect of the invention includes the aforementioned lubricating structure of the internal combustion engine. According to the configuration, the oil passages from the main gallery of the crankcase of the motorcycle to the driveshaft can be simplified.

According to the lubricating structure of the internal combustion engine in the first aspect of the invention, oil is delivered to the midway of the driveshaft through the oil passages shared with the bearing of the crankshaft and the bearing of the balancer shaft. Accordingly, the oil passages from the main gallery up to the driveshaft can be simplified. In addition, the balancer shaft is disposed below the crankshaft. Thus, the width of the crankcase in the front/rear direction can be reduced and mass centralization can be attained.

The lubricating structure of the internal combustion engine in the second aspect of the invention is a lubricating structure of an internal combustion engine that feeds oil to a bearing of a balancer shaft disposed in parallel with a crankshaft in a crankcase, wherein: a main gallery, a first oil passage, and a second oil passage are formed in the crankcase so that oil can be distributed to respective portions of the internal combustion engine through the main gallery, the oil of the main gallery can be fed to a bearing of the crankshaft through the first oil passage, and the oil having passed through the bearing of the crankshaft can be fed to a bearing of the balancer shaft through the second oil passage.

According to the configuration, oil is fed from the main gallery to the bearing of the crankshaft through the first oil passage, and further fed to the bearing of the balancer shaft through the second oil passage. The oil is delivered to the midway of the bearing of the balancer shaft through the first oil passage shared with the bearing of the crankshaft. Accordingly, the oil passages from the main gallery toward the balancer shaft can be simplified. Since the oil passages can be shortened, pressure loss due to resistance of the oil passages can be reduced, and oil pressure followability to fluctuation in rotation of the crankshaft can be improved. Further, the first and second oil passages are formed in the crankcase. Accordingly, the crankcase can be reduced in weight and occurrence of deburring work can be also prevented, in comparison with a case where new pipe passages are provided to form oil passages.

In the lubricating structure of the internal combustion engine in the second aspect of the invention, preferably, the second oil passage may be formed linearly. According to the configuration, the second oil passage can be machined easily. In addition, the second oil passage can be formed to be shorter.

In the lubricating structure of the internal combustion engine in the second aspect of the invention, preferably, the balancer shaft may be disposed below the crankshaft. According to the configuration, the second oil passage is extended in an up/down direction so that oil can be fed from the bearing of the crankshaft to the bearing of the balancer shaft through the second oil passage.

In the lubricating structure of the internal combustion engine in the second aspect of the invention, preferably, the crankcase may include an upper case and a lower case that are divided from each other vertically, and the first oil passage and the second oil passage may be formed in the lower case. According to the configuration, the first and second oil passages are formed in the same lower case so that the oil passages can be further simplified.

In the lubricating structure of the internal combustion engine in the second aspect of the invention, preferably, the balancer shaft may serve as a lower balancer shaft that is disposed below the crankshaft, and the main gallery may be formed in front of the lower balancer shaft in the crankcase. According to the configuration, the width of the crankcase in the front/rear direction can be reduced, in comparison with a case where a balancer shaft is disposed before or after a crankshaft in a crankcase. In addition, the arrangement of the lower balancer shaft can be also prevented from interfering with the main gallery.

In the lubricating structure of the internal combustion engine in the second aspect of the invention, preferably, a driveshaft of a transmission may be disposed in parallel with the crankshaft in the crankcase, and a third oil passage may be formed in the crankcase so that oil can be fed to the driveshaft through the third oil passage diverging from the middle of the second oil passage. According to the configuration, oil can be delivered to the midway of the driveshaft through the first and second oil passages shared with the bearing of the crankshaft and the bearing of the balancer shaft. Accordingly, the oil passages can be simplified, in comparison with a configuration in which an oil passage that connects a main gallery and a bearing of a driveshaft directly to each other is formed.

A motorcycle in the second aspect of the invention includes the aforementioned lubricating structure of the internal combustion engine. According to the configuration, it is possible to simplify the oil passages from the main gallery of the crankcase of the motorcycle up to the bearing of the balancer shaft.

According to the lubricating structure of the internal combustion engine in the second aspect of the invention, oil can be delivered to the midway of the bearing of the balancer shaft through the first oil passage shared with the bearing of the crankshaft. Accordingly, it is possible to simplify the oil passages from the main gallery up to the bearing of the balancer shaft.

REFERENCE SIGNS LIST 1 internal combustion engine
21 crankcase
27 upper case
28 lower case
34 mating face between upper case and lower case
41 crankshaft
49 driveshaft
51 front balancer shaft
54 lower balancer shaft (balancer shaft)
62 main gallery
71 journal wall
73 bearing of front balancer shaft
101 oil passage (first oil passage)
102 bearing of crankshaft
103 oil passage (second oil passage)
104 bearing of lower balancer shaft
105 oil passage (third oil passage)
109 orifice mounting portion

DETAILED DESCRIPTION OF THE INVENTION

Figure 1:
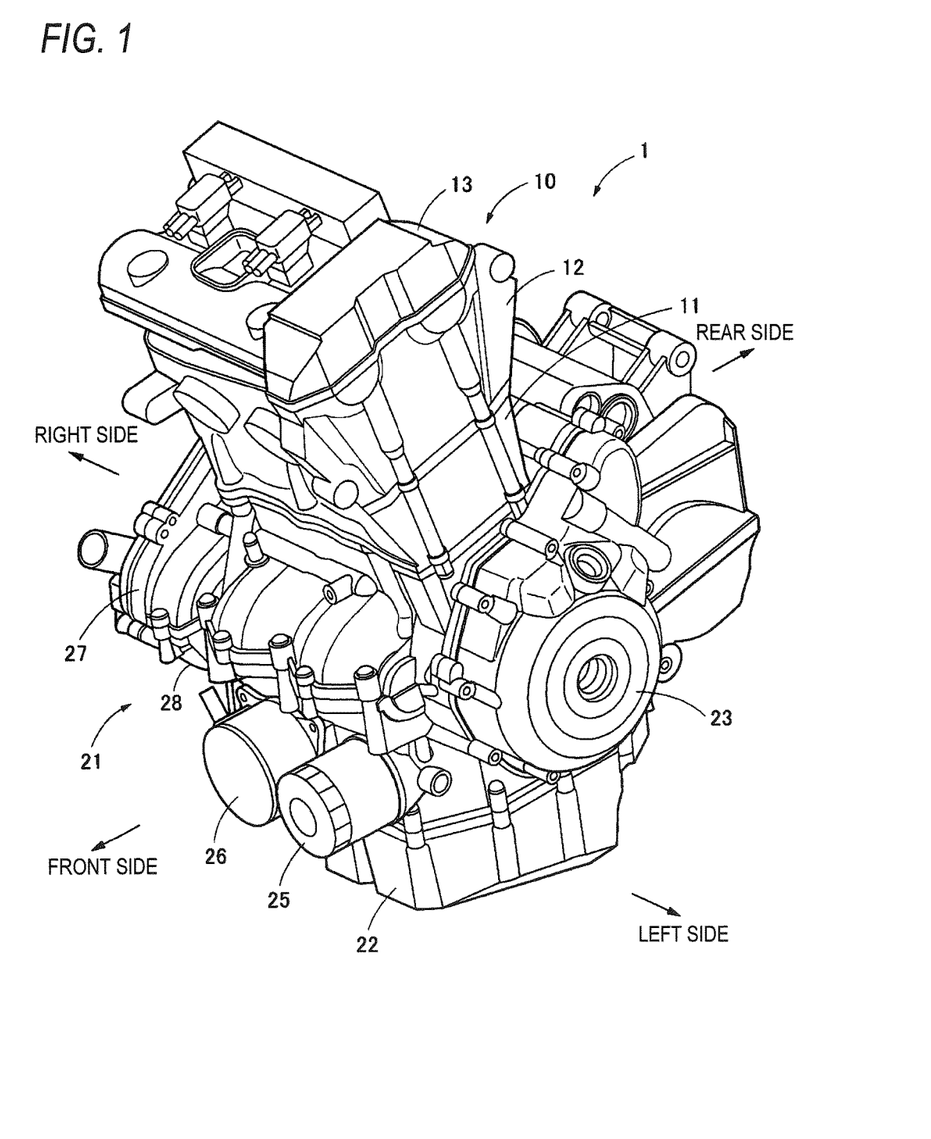
FIG. 1 is a perspective view of an internal combustion engine according to an embodiment of the invention.
Figure 2:
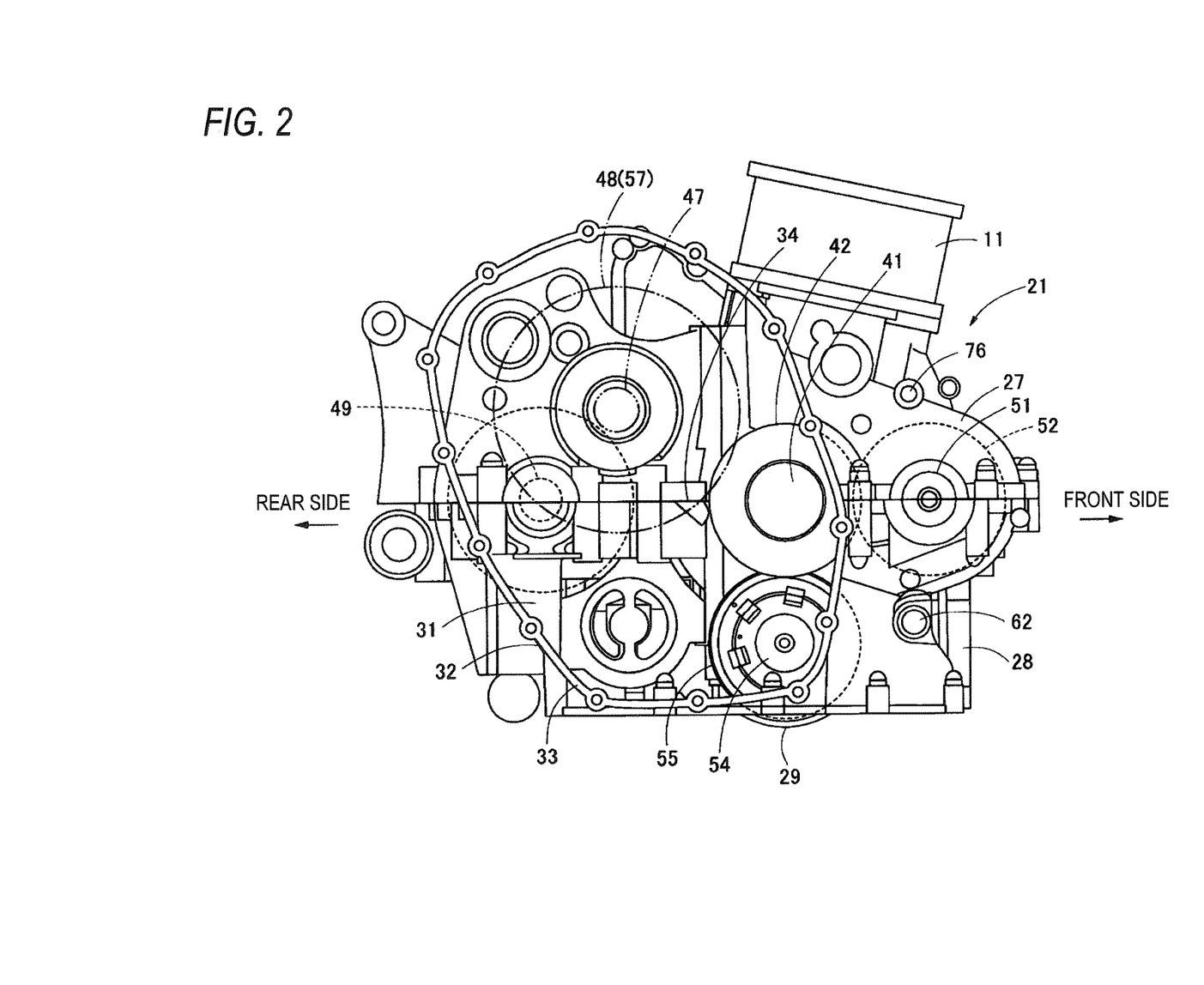
FIG. 2 is a right side view of a crankcase according to the embodiment.
Figure 3:
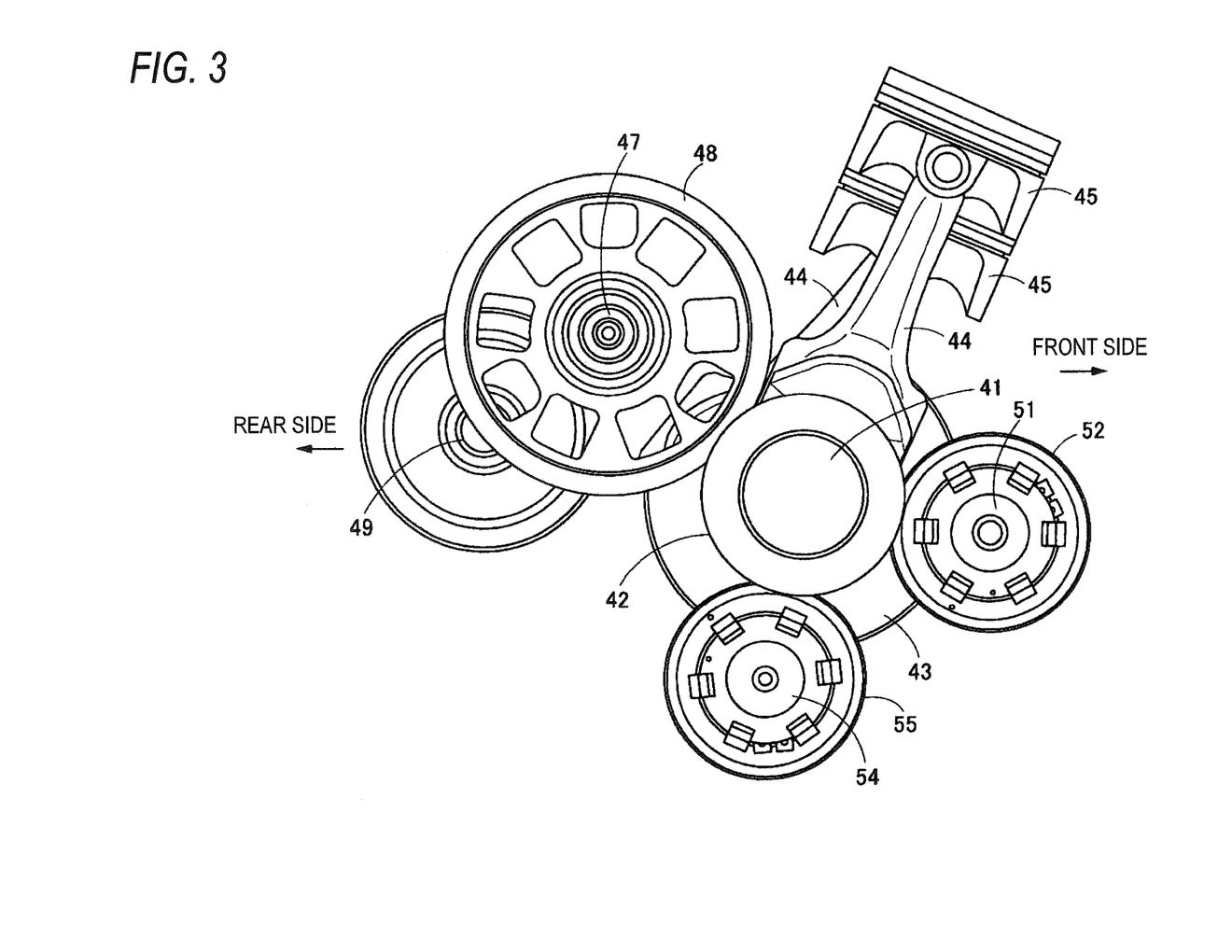
FIG. 3 is a side view showing the layout of shafts according to the embodiment.

An embodiment of the invention will be described below in detail with reference to the accompanying drawings. Incidentally, an example in which a lubricating structure of an internal combustion engine is applied to a motorcycle will be described below. The lubricating structure of the internal combustion engine is however not limited to the motorcycle but may be also applied to another vehicle such as a four-wheeled vehicle. FIG. 1 is a perspective view of the internal combustion engine according to the embodiment. FIG. 2 is a right side view of a crankcase according to the embodiment. FIG. 3 is a side view showing the layout of shafts according to the embodiment. Incidentally, for convenience of explanation, a countershaft and a clutch are designated by a two-dot chain line, and a front balancer shaft and a driveshaft in the crankcase are designated by a broken line in FIG. 2.

As shown in FIG. 1, an internal combustion engine 1 is a parallel two-cylinder engine which has a configuration in which a cylinder 10 is disposed on a crankcase 21. The cylinder 10 has a configuration in which a cylinder head 12 and a head cover 13 are attached to a cylinder block 11 disposed on the crankcase 21. An oil pan 22 in which oil for lubrication and cooling is stored is attached to a lower portion of the crankcase 21. A generator cover 23 for forming a generator chamber is attached to a left side portion of the crankcase 21. An oil filter 25 and an oil cooler 26 are attached to a front portion of the crankcase 21.

As shown in FIG. 2, the crankcase 21 has a vertically divided structure including an upper case 27 and a lower case 28. When a clutch cover (not shown) is removed, a right side space 31 of the crankcase 21 is opened to the outside. The right side space 31 of the crankcase 21 is a space which is partitioned from a crank chamber, a transmission chamber, etc. inside the crankcase by side walls of the upper case 27 and the lower case 28, and surrounded by a circumferential wall 32 protruding from the side walls of the upper case 27 and the lower case 28. A part of the right side space 31 of the crankcase 21 can be visually recognized from the outside through an opening portion in a mating face 33 with the clutch cover. The mating face 33 is formed in the circumferential wall 32.

Three main shafts, i.e. a crankshaft 41, a countershaft 47 and a driveshaft 49 are disposed in parallel with one another and triangularly on side walls (journal walls) of the crankcase 21. The crankshaft 41 is received in the crank chamber inside the crankcase and supported rotatably on a mating face 34 between the upper case 27 and the lower case 28. The countershaft 47 is received in the transmission chamber inside the crankcase, and supported rotatably on the side wall of the upper case 27 at the rear of the crankshaft 41. The driveshaft 49 is received in the transmission chamber inside the crankcase and supported rotatably on the mating face 34 between the upper case 27 and the lower case 28 at the rear of the countershaft 47.

A front balancer shaft 51 is disposed in front of the crankshaft 41. A lower balancer shaft 54 is disposed below the crankshaft 41. The front balancer shaft 51 is received in a front balancer chamber (not shown), and supported rotatably on the mating face 34 between the upper case 27 and the lower case 28. When a balancer housing 29 is attached to the lower case 28, the lower balancer shaft 54 is supported rotatably on a mating face 35 (see FIG. 6) between the lower case 28 and the balancer housing 29. Due to the balancer housing 29 which can be attached removably to the lower case 28, the lower balancer shaft 54 can be removed to thereby perform changeover between one-shaft balancer and two-shaft balancer.

A primary drive gear 42 of the crankshaft 41, a primary driven gear 48 of the countershaft 47, a front balancer driven gear 52 of the front balancer shaft 51, and a lower balancer driven gear 55 of the lower balancer shaft 54 are received in the right side space 31 of the crankcase 21. The primary driven gear 48, the front balancer driven gear 52 and the lower balancer driven gear 55 are engaged with the primary drive gear 42. When three kinds of gears are driven by a single gear in this manner, it is unnecessary to specially disengage the three kinds of gears in the crankshaft 41. Thus, the total length of the crankshaft 41 can be shortened.

In addition, the right side space 31 of the crankcase 21 is opened to the outside through the opening portion in the mating face 33 with the clutch cover, as described above. The primary drive gear 42 except a part thereof is exposed to the outside from the crankcase 21. A clutch 57 and the primary driven gear 48 are entirely exposed to the outside. In addition, the front balancer driven gear 52 is hidden inside the crankcase 21. The lower balancer driven gear 55 except a part thereof is exposed to the outside from the crankcase 21. When the gears are exposed to the outside from the right side space 31 in this manner, alignment (phase matching) among the gears can be made easily.

As shown in FIG. 3, the crankshaft 41 has a configuration in which crank webs 43 are connected through crank pins (not shown) and crank journals (not shown). Pistons 45 are connected to the crank pins through connecting rods 44. Reciprocating motion of the pistons 45 is converted into rotating motion of the crankshaft 41. Rotation of the crankshaft 41 is transmitted to the countershaft 47 through the primary drive gear 42 and the primary driven gear 48. Rotation of the countershaft 47 is transmitted to the driveshaft 49 at a predetermined transmission ratio corresponding to a combination of transmission gears (not shown).

In addition, the rotation of the crankshaft 41 is transmitted to the front balancer shaft 51 through the primary drive gear 42 and the front balancer driven gear 52, and transmitted to the lower balancer shaft 54 through the primary drive gear 42 and the lower balancer driven gear 55. Periodical vibration occurring in the crankshaft 41 can be cancelled by the front balancer shaft 51 and the lower balancer shaft 54. The connecting rods 44, the lower balancer shaft 54, the front balancer shaft 51 and the countershaft 47 are disposed on upper, lower, front and rear sides of the crankshaft 41, respectively. With this layout, an internal space of the crankcase 21 (see FIG. 2) can be used effectively.

In the crankcase 21 configured thus, the lower balancer shaft 54 is disposed below the crankshaft 41. Thus, the width of the crankcase 21 in a front/rear direction can be reduced and mass centralization can be further attained, in comparison with a configuration in which the balancer shaft is disposed on the front or rear side of the crankcase 21. In addition, a main gallery 62 (see FIG. 2) is formed in front of the lower balancer shaft 54. In this manner, the arrangement of the lower balancer shaft 54 can be prevented from interfering with the main gallery 62. In this case, the configuration is different from a configuration in which the main gallery is disposed right under the crankshaft as in a normal crankcase. Therefore, it is necessary to change lubricating channels for the respective portions of the internal combustion engine 1.

Particularly, the lubricating channels of the crankcase 21 have to be specialized for a two-shaft balancer structure in which the balancer shafts 52 and 54 can be disposed in front of and below the crankshaft 41 respectively. In the embodiment, oil passages 103 extending from bearings 102 of the crankshaft 41 toward bearings 104 of the lower balancer shaft 54 are formed on a downstream side of oil passages 101 extending from the gallery 62 toward the bearings 102 of the crankshaft 41 (see FIG. 6). Oil is fed to the midways of the bearings 104 of the lower balancer shaft 54 through the oil passages shared with the bearings 102 of the crankshaft 41. Thus, the oil passages can be simplified.

Further, an oil passage 105 is formed to diverge from one of the oil passages 103 and extend toward the driveshaft 49. The oil is fed to the midway of the driveshaft 49 through the oil passages shared with one of the bearings 102 of the crankshaft 41 and one of the bearings 104 of the lower balancer shaft 54. Thus, the oil passages can be simplified.

Figure 4:
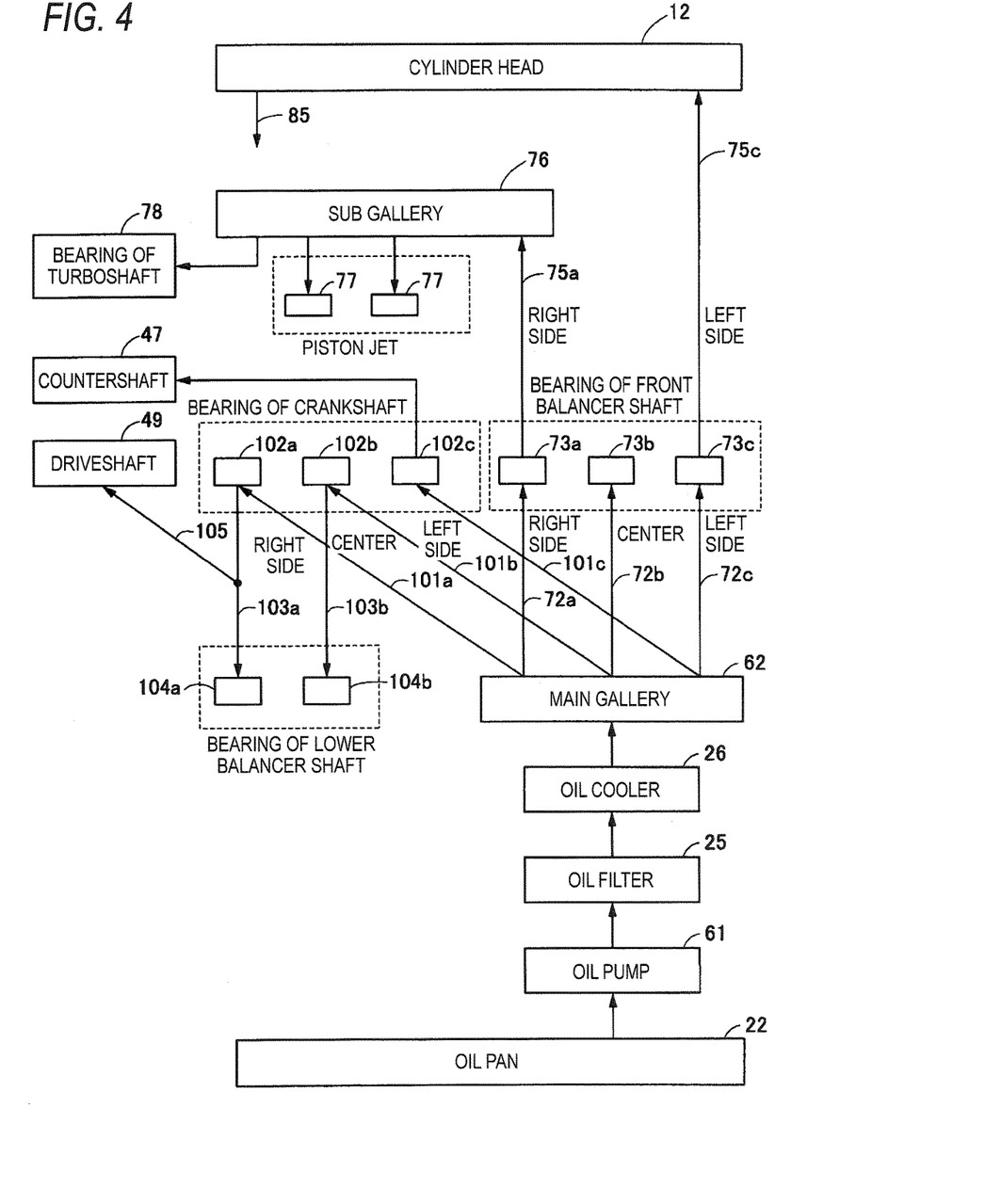
FIG. 4 is a block diagram showing lubricating channels of the internal combustion engine according to the embodiment.

The lubricating channels of the internal combustion engine formed inside the crankcase will be described below with reference to FIG. 4. FIG. 4 is a block diagram showing the lubricating channels of the internal combustion engine according to the embodiment.

As shown in FIG. 4, oil is stored in the oil pan 22 in the lower portion of the crankcase 21 (see FIG. 1). The oil in the oil pan 22 is sucked through a strainer by an oil pump 61 driven by the countershaft 47. The oil sucked through the strainer is delivered to the oil filter 25 by the oil pump 61. In addition, the oil in the oil filter 25 is delivered to the oil cooler 26 by the oil pump 61, and then delivered to the main gallery 62. On this occasion, fine foreign matter in the oil is filtered out by the oil filter 25 and the oil is cooled by the oil cooler 26.

Figure 5:
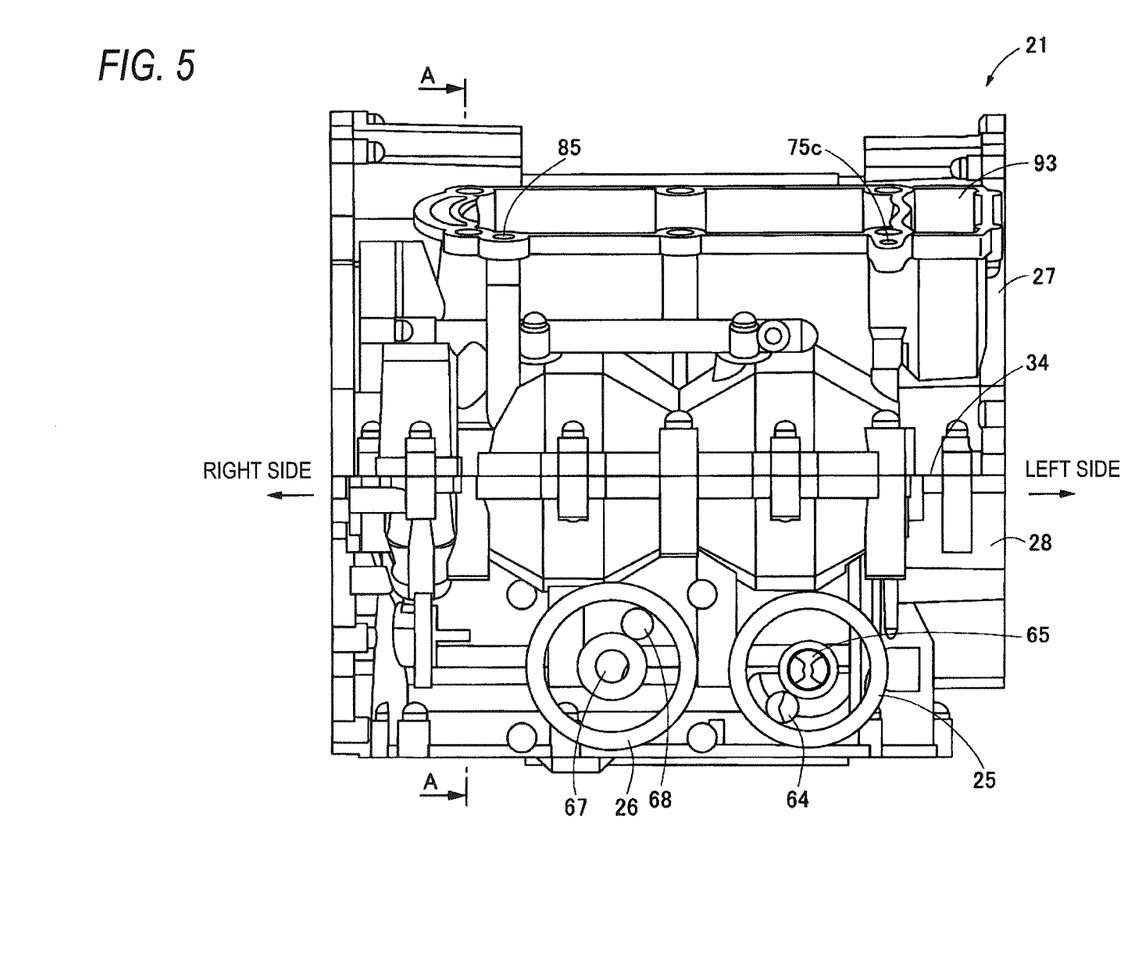
FIG. 5 is a front view of the crankcase according to the embodiment.

The oil filter 25 and the oil cooler 26 are disposed on a front face of the crankcase 21 (see FIG. 5). An inlet 64 communicating with the oil pump 61 and an outlet 65 communicating with the oil cooler 26 are formed in a mounting face of the oil filter 25 (see FIG. 5). The inlet 64 of the oil filter 25 is formed on a lower side than the center. The outlet 65 of the oil filter 25 is formed in the center. An inlet 67 communicating with the oil filter 25, and an outlet 68 communicating with the main gallery 62 are formed in a mounting face of the oil cooler 26 (see FIG. 5). The inlet 67 of the oil cooler 26 is formed in the center. The outlet 68 of the oil cooler 26 is formed on an upper side than the center.

The oil in the main gallery 62 is fed to bearings 73a to 73c of the front balancer shaft 51 through oil passages 72a to 72c inside right, center and left journal walls 71a to 71c (see FIG. 7) of the lower case 28, respectively. The oil of the right bearing 73a of the front balancer shaft 51 is fed to a sub gallery 76 through an oil passage 75a inside a right journal wall (not shown) of the upper case 27. The oil in the sub gallery 76 is fed to piston jets 77 so as to be used for cooling the pistons 45 (see FIG. 3). Further, the oil in the sub gallery 76 is fed to a bearing 78 of a turboshaft (not shown) of a supercharger.

In addition, the oil of the left bearing 73c of the front balancer shaft 51 is fed to the cylinder head 12 through an oil passage 75c inside a left journal wall (not shown) of the upper case 27. The oil inside the cylinder head 12 lubricates a contact portion between a cam and a tappet through the inside of a camshaft (not shown), and is then returned to the oil pan 22 through an oil return passage 85 or a cam chain chamber 93 (see FIG. 5), etc. formed in the upper case 27. Thus, a lubricating channel from the main gallery 62 toward the sub gallery 76 and a lubricating channel from the main gallery 62 toward the cylinder head 12 are formed separately in the crankcase 21.

In addition, the oil in the main gallery 62 is fed to the bearings 102a to 102c of the crankshaft 41 through the oil passages 101a to 101c inside the right, center and left journal walls 71a to 71c (see FIG. 7) of the lower case 28, respectively. The oil of the right bearing 102a and the oil of the center bearing 102b in the crankshaft 41 are fed to the bearings 104a and 104b of the lower balancer shaft 54 through the oil passages 103a and 103b inside the journal walls 71a and 71b, respectively. The right oil passage 103a branches off in the midway thereof to feed the oil to the driveshaft 49 through the oil passage 105. The oil of the left bearing 102c of the crankshaft 41 is fed to the countershaft 47 through an oil groove on the journal wall 71c.

Thus, the lubricating channels from the main gallery 62 toward the bearings 73a to 73c of the front balancer shaft 51 and the lubricating channels from the main gallery 62 toward the bearings 102a to 102c of the crankshaft 41 are formed separately in the crankcase 21. In addition, oil is fed to the sub gallery 76 and the cylinder head 12 through the lubricating channels of the bearings 73a and 73c of the front balancer shaft 51. In addition, oil is fed to the respective bearings 104a and 104b of the lower balancer shaft 54, the countershaft 47 and the driveshaft 49 through the lubricating channels of the respective bearings 102a to 102c of the crankshaft 41.

Figure 6:
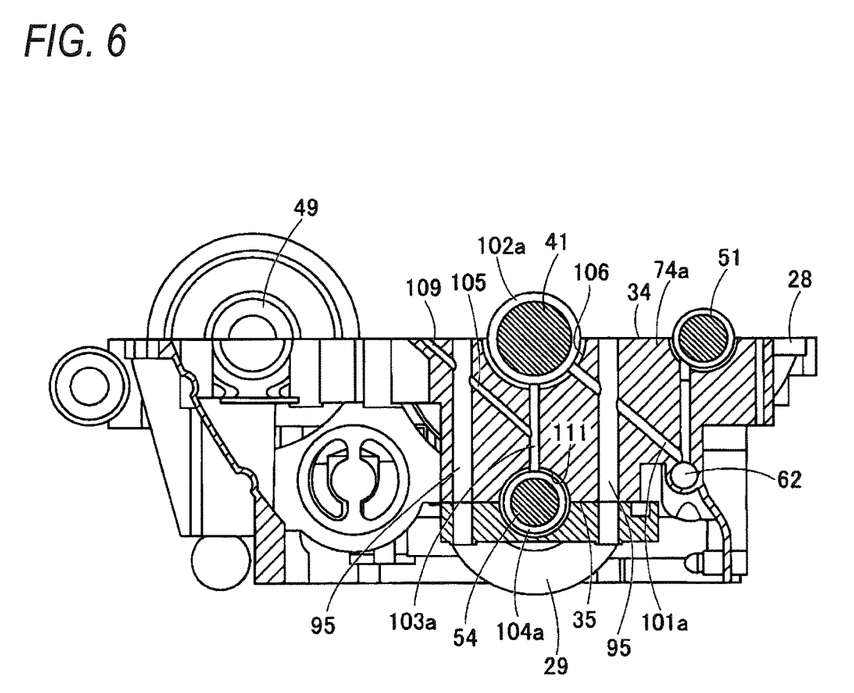
FIG. 6 is a sectional view of FIG. 5 taken along a line A-A thereof.
Figure 7:
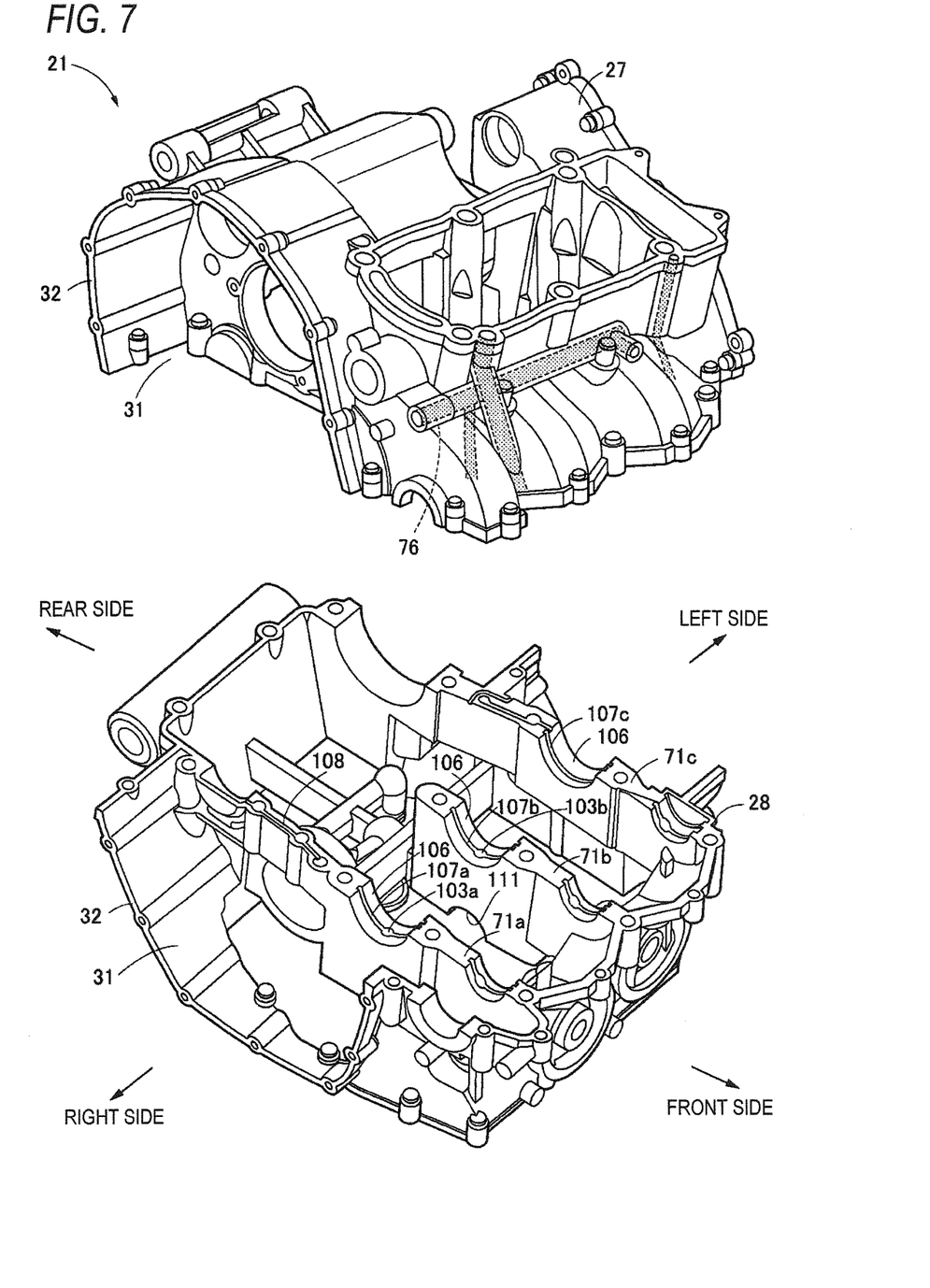
FIG. 7 is a perspective view of an upper case and a lower case according to the embodiment.

The lubricating structure of the internal combustion engine will be described below in detail. The lubricating channels of the lower balancer shaft will be described with reference to FIGS. 5 to 7. FIG. 5 is a front view of the crankcase according to the embodiment. FIG. 6 is a sectional view of FIG. 5 taken along a line A-A thereof. FIG. 7 is a perspective view of the upper case and the lower case according to the embodiment. Incidentally, FIG. 6 will be described with fastening bolts and the countershaft omitted for convenience of explanation.

As shown in FIGS. 5 and 6, the crankcase 21 includes the upper case 27 and the lower case 28 which are divided from each other vertically. The balancer housing 29 is attached to the lower case 28 below the crankshaft 41. Common fastening bolts (not shown) are inserted through the upper case 27, the lower case 28, and the balancer housing 29. The mating face 34 between the upper case 27 and the lower case 28 and the mating face 35 between the lower case 28 and the balancer housing 29 are fastened by the fastening bolts. The front balancer shaft 51, the crankshaft 41 and the driveshaft 49 are supported on the mating face 34 between the upper case 27 and the lower case 28.

The countershaft 47 (see FIG. 3) is supported on the side face of the upper case 27. The lower balancer shaft 54 is supported on the mating face 35 between the lower case 28 and the balancer housing 29. That is, in the crankcase 21, the front balancer shaft 51 is disposed in front of the crankshaft 41, and the lower balancer shaft 54 is disposed below the crankshaft 41. In addition, the countershaft 47 and the driveshaft 49 are disposed at the rear of the crankshaft 41. The main gallery 62 for distributing oil to the respective portions of the internal combustion engine 1 is formed in front of the lower balancer shaft 54 in the lower case 28 of the crankcase 21.

The main gallery 62 is formed on the obliquely lower front side of the crankshaft 41 in order to bypass the lower balancer shaft 54 positioned right below the crankshaft 41. The main gallery 62 is formed linearly in a left/right direction (vertical direction to the paper plane in FIG. 6) of the lower case 28 below the front balancer shaft 51. In the upper case 27, the sub gallery 76 for feeding oil to the respective portions of the internal combustion engine 1 is formed on the obliquely upper front side of the crankshaft 41 (see FIG. 7). The sub gallery 76 is formed in parallel with the main gallery 62 above the front balancer shaft 51.

As shown in FIGS. 6 and 7, the oil passages 101a to 101c for feeding oil of the main gallery 62 to the bearings 102a to 102c of the crankshaft 41 are formed in the lower case 28 (see the bearings 102b and 102c and the oil passages 101b and 101c in FIG. 4). The oil passages 101a to 101c extend obliquely up to bearing mounting faces 106 for the crankshaft 41 from the main gallery 62. On this occasion, the oil passages 101a to 101c go through bolt holes 95 for the fastening bolts. The bolt holes 95 are larger in diameter than shaft portions of the fastening bolts. Gaps between the bolt holes 95 and the shaft portions of the fastening bolts become oil passages. The oil passages 101a to 101c are extended linearly without bypassing the bolt holes 95 so that the oil passages 101a to 101c can be shortened.

In addition, the oil passages 103a and 103b are formed in the lower case 28 so that the oil which has passed through the right and center bearings 102a and 102b of the crankshaft 41 can be fed to the bearings 104a and 104b of the lower balancer shaft 54 through the oil passages 103a and 103b respectively. The oil passages 103a and 103b are provided straightly downward to extend from the bearing mounting faces 106 for the crankshaft 41 up to bearing mounting faces 111 for the lower balancer shaft 54. The oil passages 103a and 103b are formed linearly in an up/down direction. Thus, the oil passages 103a and 103b can be machined easily. The oil passages 103a and 103b can be shortened.

In addition, the oil passages 101a to 101c and the oil passages 103a to 103c are formed in the same lower case 28. Accordingly, the oil passages can be simplified. Oil grooves 107a to 107c (see FIG. 7) are formed in the bearing mounting faces 106 for the crankshaft 41. The right and center oil grooves 107a and 107b serve as oil passages which make connection between the oil passages 101a and 101b and the oil passages 103a and 103b. The left oil groove 107c extends along an upper face of the journal wall 71c toward the countershaft 47 (see FIG. 3) so that the left oil groove 107c can serve as an oil passage for feeding the oil having passed through the bearing 102c of the crankshaft 41 to the countershaft 47.

Further, the oil passage 105 is formed in the lower case 28 so that the oil having passed through the right bearing 102a of the crankshaft 41 can be fed to the driveshaft 49 through the oil passage 105 which diverges from the middle of the right oil passage 103a. The oil passage 105 extends obliquely up to the mating face 34 between the upper case 27 and the lower case 28 from the middle of the oil passage 103a. On this occasion, the oil passage 105 goes through the bolt hole 95 for the fastening bolt. As described above, the gap between the bolt hole 95 and the shaft portion of the fastening bolt serves as an oil passage. The oil passage 105 is extended linearly without bypassing the bolt hole 95. In this manner, the oil passage 105 can be shortened.

The oil passage 105 extends obliquely. Accordingly, the oil passage 105 extending toward the driveshaft 49 can be shortened. An oil groove 108 (see FIG. 7) extending from an outlet of the oil passage 105 toward the driveshaft 49 is formed in an upper face (mating face 34) of the journal wall 71a. The oil passages 101a, 103a and 105 and the oil groove 108 are formed in the journal wall 71a which supports a right end of the crankshaft 41. Accordingly, the oil passages 101a, 103a and 105 and the oil groove 108 are disposed linearly from the main gallery 62 toward a right end of the driveshaft 49 in top view. Accordingly, the oil passages extending from the main gallery 62 toward the driveshaft 49 can be simplified.

In addition, the oil passage 101a and the oil passage 105 are formed to have the same inclination angle with respect to the mating face 34 between the upper case 27 and the lower case 28. At the same time, the oil passage 101a and the oil passage 105 are formed to have the same passage diameter. Thus, the oil passages 101a and 105 can be formed by machining the crankcase 21 from the same direction by a machining tool having the same diameter. Thus, machining cost can be reduced. The outlet of the oil passage 105 serves as an orifice mounting portion 109 in which an orifice (not shown) can be mounted. Due to the orifice which is mounted in the orifice mounting portion 109, an oil flow rate from the oil passage 105 toward the driveshaft 49 can be suppressed even when the oil passage 105 is formed to have the same diameter as the oil passage 101a.

In this manner, oil is delivered from the main gallery 62 to the bearings 102a to 102c of the crankshaft 41. The oil of the bearing 102a and the oil of the bearing 102b are fed to the bearings 104a and 104b of the lower balancer shaft 54 through the oil passages 103a and 103b, respectively. In addition, the oil of the bearing 102a is fed to the driveshaft 49 through the oil passage 105 diverging from the middle of the oil passage 103a. Parts of the oil passages 101a and 101b are shared by the crankshaft 41 and the lower balancer shaft 54. A part of the oil passage 103a is shared by the lower balancer shaft 54 and the driveshaft 49. Accordingly, the lubricating channels inside the crankcase 21 can be simplified so that the total length of the oil passages can be formed to be short.

As described above, according to the embodiment, the lower balancer shaft 54 is disposed below the crankshaft 41. Thus, the width of the crankcase 21 in the front/rear direction can be reduced, and mass centralization can be attained. In addition, oil is fed from the main gallery 62 to the bearings 102*a* to 102*c* of the crankshaft 41 through the oil passages 101*a* to 101*c*. The oil is fed to the bearings 104*a* and 104*b* of the lower balancer shaft 54 through the oil passages 103*a* and 103*b*. Further, the oil is fed to the driveshaft 49 through the oil passage 105. The oil is delivered to the midways of the bearings 104*a* and 104*b* of the lower balancer shaft 54 through the oil passages 101*a* and 101*b* shared with the bearings 102*a* and 102*b* of the crankshaft 41. Accordingly, the oil passages extending from the main gallery 62 toward the lower balancer shaft 54 can be simplified. The oil is delivered to the midway of the driveshaft 49 through the oil passage 101*a* shared with the bearing 102*a* of the crankshaft 41 and the oil passage 103*a* shared with the bearing 104*a* of the lower balancer shaft 54. Accordingly, the oil passages extending from the main gallery 62 toward the driveshaft 49 can be simplified. Since the oil passages can be shortened, pressure loss due to resistance of the oil passages can be reduced, and oil pressure followability due to fluctuation in rotation of the crankshaft can be improved. Further, due to the oil passages formed in the crankcase 21, the weight of the crankcase 21 can be reduced and occurrence of deburring work can be also prevented, in comparison with a case where new pipe passages are provided to form oil passages.

Incidentally, the invention is not limited to the aforementioned embodiment but may be changed variously and carried out. In the aforementioned embodiment, the sizes or shapes etc. illustrated in the accompanying drawings are not limited thereto but can be changed suitably as long as the effects of the invention can be exerted. Moreover, the sizes or shapes etc. illustrated in the accompanying drawings can be changed suitably and carried out without departing from the scope of the objects of the invention.

For example, the oil passage 105 is formed in the right journal wall 71*a* in the aforementioned embodiment. However, the invention is not limited to this configuration. It will go well if the oil passage 105 can be formed in a journal wall 71 on which one end of the driveshaft 49 is supported. For example, the oil passage 105 may be formed in the left journal wall 71*c* on which a left end of the driveshaft 49 is supported.

For example, the oil passages 103 are formed in the right and center journal walls 71*a* and 71*b* in the aforementioned embodiment. However, the invention is not limited to this configuration. It will go well if the oil passages 103 can be formed in the journal walls 71 on which the lower balancer shaft 54 is supported. For example, when the lower balancer shaft 54 is supported on the center and left journal walls 71*b* and 71*c*, the oil passages 103 can be formed in the journal walls 71*b* and 71*c*.

In addition, two balancer shafts, i.e. the front balancer shaft 51 and the lower balancer shaft 54 are disposed in the crankshaft 21 in the configuration of the aforementioned embodiment. However, the invention is not limited to this configuration. It will go well if at least one balancer shaft can be disposed in the crankcase 21.

In addition, the front balancer shaft 51 is disposed on the mating face 34 between the upper case 27 and the lower case 28 in the configuration of the aforementioned embodiment. However, the invention is not limited to this configuration. The front balancer shaft 51 may be disposed on one of the upper case 27 and the lower case 28.

In addition, the crankcase 21 has a vertically divided structure including the upper case 27 and the lower case 28 in the configuration of the aforementioned embodiment. However, the invention is not limited to this configuration. The crankcase 21 may have a horizontally divided structure including a left case and a right case in the configuration.

In addition, the oil passage 105 diverges from the middle of the oil passage 103*a* and extends obliquely toward the mating face 34 between the upper case 27 and the lower case 28 in the configuration of the aforementioned embodiment. However, the invention is not limited to this configuration. It will go well if the oil passage 105 can be formed to diverge from the middle of the oil passage 103*a* and feed the oil which has passed through the bearing 102*a* of the crankshaft 41 to the driveshaft 49.

In addition, each oil passage 101 and the oil passage 105 are formed to have the same the inclination angle with respect to the mating face 34 between the upper case 27 and the lower case 28 in the aforementioned embodiment. However, the invention is not limited to this configuration. The inclination angles of the oil passage 101 and the oil passage 105 may be different from each other.

In addition, the oil passage 101 and the oil passage 105 are formed to have the same passage diameter in the aforementioned embodiment. However, the invention is not limited to this configuration. The passage diameters of the oil passage 101 and the oil passage 105 may be different from each other. For example, the oil passage 105 may be formed to be narrower than the oil passage 101. In this manner, an oil flow rate toward the driveshaft 49 can be suppressed without mounting any orifice.

In addition, each of the oil passages 103 is formed linearly in the configuration of the aforementioned embodiment. However, the invention is not limited to this configuration. It will go well if the oil passage 103 can be formed to be capable of feeding the oil which has passed through the corresponding bearing 102 of the crankshaft 41 to the lower balancer shaft 54. For example, the oil passage 103 may be formed into an arc shape.

In addition, the lower balancer shaft 54 is disposed on the mating face 35 between the lower case 28 and the balancer housing 29 in the configuration of the aforementioned embodiment. However, the invention is not limited to this configuration. The lower balancer shaft 54 may be disposed in the lower case 28. In this case, the balancer housing 29 can be dispensed with in the configuration.

In addition, the lower balancer shaft 54 is disposed below the crankshaft 41 in the configuration of the aforementioned embodiment. However, the second aspect of the invention is not limited to this configuration. In the second aspect of the invention, the lower balancer shaft 54 may be replaced by a rear balancer shaft disposed at the rear of the crankshaft 41.

In addition, the oil passages 101 and 103 are formed in the same lower case 28 in the configuration of the aforementioned embodiment. However, the invention is not limited to this configuration. For example, the oil passages 101 and 103 may be formed to extend over the upper case 27 and the lower case 28.

In addition, oil is fed to the driveshaft 49 through the oil passage 105 diverging from the middle of the oil passage 103*a* in the configuration of the aforementioned embodiment. However, the second aspect of the invention is not limited to this configuration. In the second aspect of the invention, oil may be fed to the driveshaft 49 through another lubricating channel.

In addition, the oil grooves 107 are formed in the bearing mounting faces 106 of the journal walls 71, and oil is made to pass through the bearings 102 of the crankshaft 41 in the configuration of the aforementioned embodiment. However, the invention is not limited to this configuration. It will go well if oil can pass through the bearings 102 of the crankshaft 41 in the configuration. For example, oil grooves may be formed in the bearings 102 or oil grooves may be formed in the crankshaft 41.

What is claimed is:

1. A lubricating structure of an internal combustion engine that feeds oil to a driveshaft of a transmission disposed in parallel with a crankshaft and a balancer shaft in a crankcase, wherein: the balancer shaft is disposed below the crankshaft and the driveshaft is disposed rearward of the crankshaft; a main gallery, a first oil passage, a second oil passage and a third oil passage are formed in the crankcase so that oil can be distributed to respective portions of the internal combustion engine through the main gallery located in front of the balancer shaft, the oil of the main gallery can be fed to a bearing of the crankshaft through the first oil passage, the oil having passed through the bearing of the crankshaft can be fed to a bearing of the balancer shaft through the second oil passage, and the oil having passed through the bearing of the crankshaft can be fed to the driveshaft through the third oil passage diverging from the middle of the second oil passage; the crankcase having an upper case and a lower case that are divided from each other vertically; and the third oil passage extends obliquely toward a mating face between the upper case and the lower case from the middle of the second oil passage.

2. The lubricating structure of an internal combustion engine according to claim 1, wherein the first oil passage, the second oil passage and the third oil passage are formed in a journal wall that supports one end of the crankshaft.

3. The lubricating structure of an internal combustion engine according to claim 1, wherein: the first oil passage extends obliquely towards the bearing of the crankshaft from the main gallery; and the first oil passage and the third oil passage have the same inclination angle with respect to the mating face between the upper case and the lower case.

4. The lubricating structure of an internal combustion engine according to claim 1, wherein the first oil passage and the third oil passage have the same passage diameter.

5. The lubricating structure of an internal combustion engine according to claim 1, wherein the third oil passage has an orifice mounting portion in which an orifice can adjust a passage diameter of the third oil passage.

6. A motorcycle comprising: the lubricating structure of an internal combustion engine according to claim 1.

7. A lubricating structure of an internal combustion engine that feeds oil to a bearing of a balancer shaft disposed in parallel with a crankshaft in a crankcase, wherein: a main gallery, a first oil passage, and a second oil passage are formed in the crankcase so that oil can be distributed to respective portions of the internal combustion engine through the main gallery, the oil of the main gallery can be fed to a bearing of the crankshaft through the first oil passage, the oil having passed through the bearing of the crankshaft can be fed to a bearing of the balancer shaft through the second oil passage, the balancer shaft serves as a lower balancer shaft that is disposed below the crankshaft; the main gallery is formed in front of the lower balancer shaft in the crankcase, a driveshaft of a transmission is disposed in parallel with the crankshaft in the crankcase; and a third oil passage is formed in the crankcase so that oil can be fed to the driveshaft through the third oil passage diverging from the middle of the second oil passage.

8. The lubricating structure of an internal combustion engine according to claim 7, wherein the second oil passage is formed linearly.

9. The lubricating structure of an internal combustion engine according to claim 7, wherein the balancer shaft is disposed below the crankshaft.

10. The lubricating structure of an internal combustion engine according to claim 7, wherein:
the crankcase comprises an upper case and a lower case that are divided from each other vertically; and
the first oil passage and the second oil passage are formed in the lower case.

11. A motorcycle comprising: the lubricating structure of an internal combustion engine according to claim 7.

* * * * *